(12) United States Patent
Jeon

(10) Patent No.: US 11,072,318 B2
(45) Date of Patent: *Jul. 27, 2021

(54) HYDRAULIC UNIT OF ELECTRONIC CONTROL BRAKE SYSTEM

(71) Applicant: MANDO CORPORATION, Gyeonggi-do (KR)

(72) Inventor: In-Wook Jeon, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,445

(22) Filed: Sep. 9, 2019

(65) Prior Publication Data

US 2020/0001845 A1 Jan. 2, 2020

Related U.S. Application Data

(63) Continuation of application No. 14/884,741, filed on Oct. 15, 2015, now Pat. No. 10,407,040.

(30) Foreign Application Priority Data

Oct. 17, 2014 (KR) .......................... 10-2014-0140753

(51) Int. Cl.
*B60T 13/68* (2006.01)
*B60T 7/04* (2006.01)
(Continued)

(52) U.S. Cl.
CPC ............ *B60T 13/686* (2013.01); *B60T 7/042* (2013.01); *B60T 8/3675* (2013.01);
(Continued)

(58) Field of Classification Search
CPC . B60T 7/06; B60T 7/042; B60T 17/06; B60T 8/17; B60T 8/366; B60T 8/368;
(Continued)

(56) References Cited

U.S. PATENT DOCUMENTS

| 2002/0149259 A1 | 10/2002 | Otomo et al. | |
| 2003/0111898 A1* | 6/2003 | Reuter | B60T 8/368 303/122.09 |

(Continued)

FOREIGN PATENT DOCUMENTS

| CN | 1812904 | 8/2006 |
| CN | 1840391 | 10/2006 |

(Continued)

OTHER PUBLICATIONS

Office Action dated Aug. 17, 2017 for Chinese Patent Appl. No. 201510671599.6 and its English machine translation by Global Dossier.

(Continued)

*Primary Examiner* — Robert A. Siconolfi
*Assistant Examiner* — San M Aung
(74) *Attorney, Agent, or Firm* — Ladas & Parry, LLP

(57) ABSTRACT

A hydraulic unit of an electronic control brake system is disclosed. The hydraulic unit of the electronic control brake system includes a modulator block having a plurality of accommodating bores in which a plurality of valves and pressure sensors coupled to a master cylinder to control braking hydraulic pressure supplied towards vehicle wheels are installed. Passages connecting between the accommodating bores are formed in the modulator block, and the passages are formed to be divided into two layers.

20 Claims, 5 Drawing Sheets

(51) Int. Cl.
  *B60T 8/36* (2006.01)
  *B60T 13/14* (2006.01)
  *B60T 13/74* (2006.01)
  *B60T 8/40* (2006.01)

(52) U.S. Cl.
  CPC .......... *B60T 13/146* (2013.01); *B60T 13/745* (2013.01); *B60T 8/4081* (2013.01)

(58) Field of Classification Search
  CPC .... B60T 8/3675; B60T 8/4081; B60T 13/662; B60T 13/686; B60T 13/745; B60T 13/146; B60T 13/58; B60T 13/66; B60T 13/665; B60T 13/683; B60T 17/228
  USPC .......................................................... 303/15
  See application file for complete search history.

(56) References Cited

U.S. PATENT DOCUMENTS

| | | |
|---|---|---|
| 2006/0220768 A1 | 10/2006 | Iyatani |
| 2007/0018498 A1 | 1/2007 | Nakazawa |
| 2008/0230337 A1 | 9/2008 | Kajiyama et al. |
| 2010/0180690 A1* | 7/2010 | Shinohara ............... B60T 8/368 73/756 |
| 2010/0207446 A1 | 8/2010 | Tandler et al. |
| 2010/0276925 A1* | 11/2010 | Bareiss ............... F15B 13/0814 285/125.1 |
| 2011/0036434 A1 | 2/2011 | Fischbach-Borazio et al. |
| 2011/0062773 A1 | 3/2011 | Misunou et al. |
| 2012/0139331 A1 | 6/2012 | Terashima et al. |
| 2012/0326493 A1 | 12/2012 | Okamura et al. |
| 2013/0319562 A1 | 12/2013 | Weh |
| 2015/0298675 A1 | 10/2015 | Mayr et al. |
| 2016/0107626 A1 | 4/2016 | Jeon |

FOREIGN PATENT DOCUMENTS

| | | |
|---|---|---|
| CN | 101205939 | 6/2008 |
| CN | 101269656 | 9/2008 |
| CN | 103419770 | 12/2013 |
| CN | 103448711 | 12/2013 |
| DE | 10 2013 207 419 | 1/2014 |
| DE | 10 2012 223 059 | 6/2014 |
| JP | 2007-022351 | 2/2007 |
| KR | 10-2007-0049474 | 5/2007 |
| KR | 10-2010-0031597 | 3/2010 |
| KR | 10-2013-0092045 | 8/2013 |
| KR | 10-2014-0107326 | 9/2014 |

OTHER PUBLICATIONS

Office Action dated Jun. 23, 2015 for Korean Patent Appl. No. 10-2014-0140753 and its English machine translation by Google Translate.
Notice of Allowance dated Apr. 25, 2019 for U.S. Appl. No. 14/884,741 (now published as US. 2016/0107626).
Final Office Action dated Jan. 8, 2019 for U.S. Appl. No. 14/884,741 (now published as US. 2016/0107626).
Non-Final Office Action dated Aug. 23, 2018 for U.S. Appl. No. 14/884,741 (now published as US. 2016/0107626).
Non-Final Office Action dated Dec. 4, 2017 for U.S. Appl. No. 14/884,741 (now published as US. 2016/0107626).
Advisory Action dated Jul. 14, 2017 for U.S. Appl. No. 14/884,741 (now published as US. 2016/0107626).
Final Office Action dated Mar. 30, 2017 for U.S. Appl. No. 14/884,741 (now published as US. 2016/0107626).
Non-Final Office Action dated Sep. 20, 2016 for U.S. Appl. No. 14/884,741 (now published as US. 2016/0107626).

* cited by examiner

[Fig. 1]
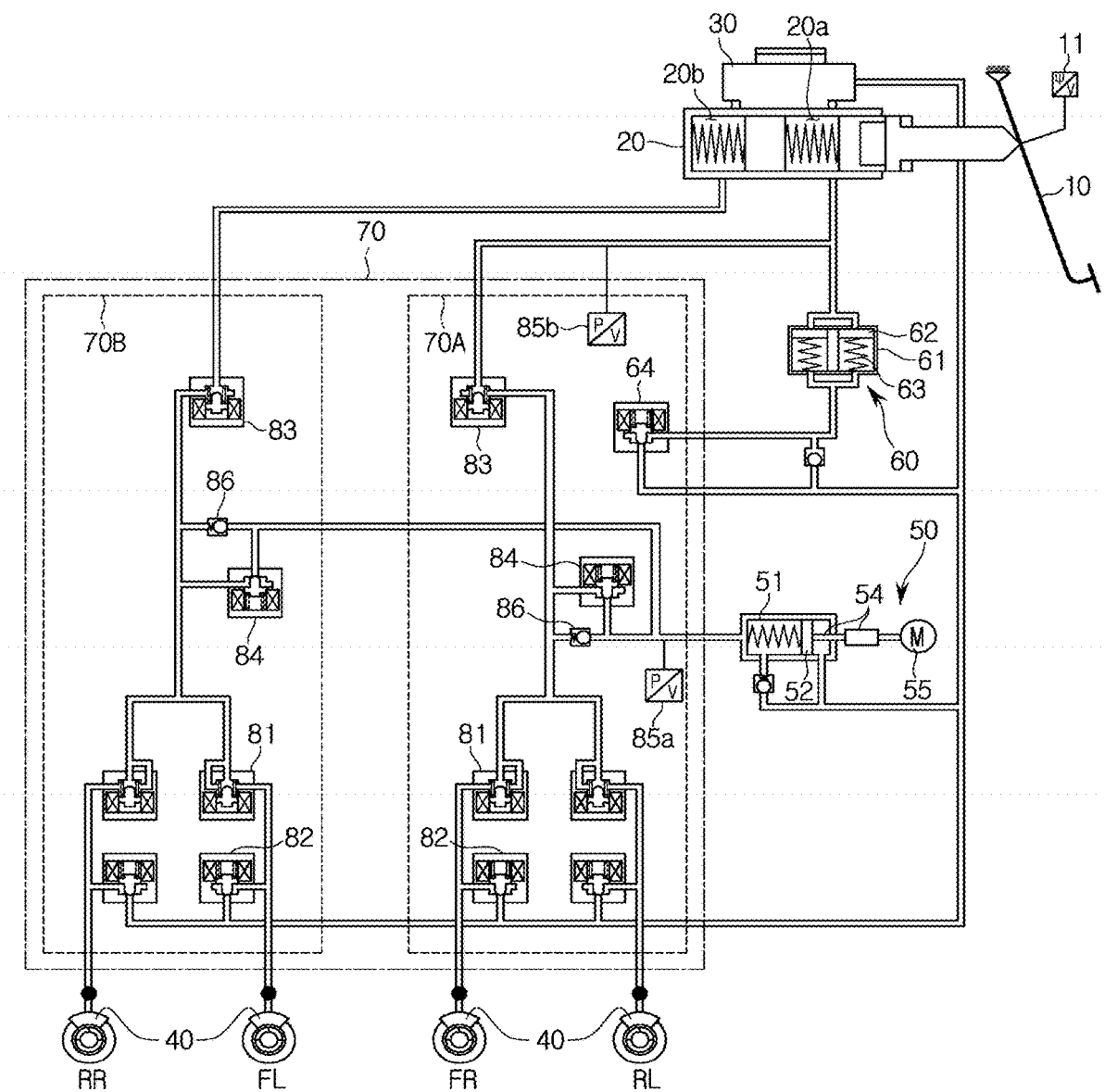

[Fig 2]
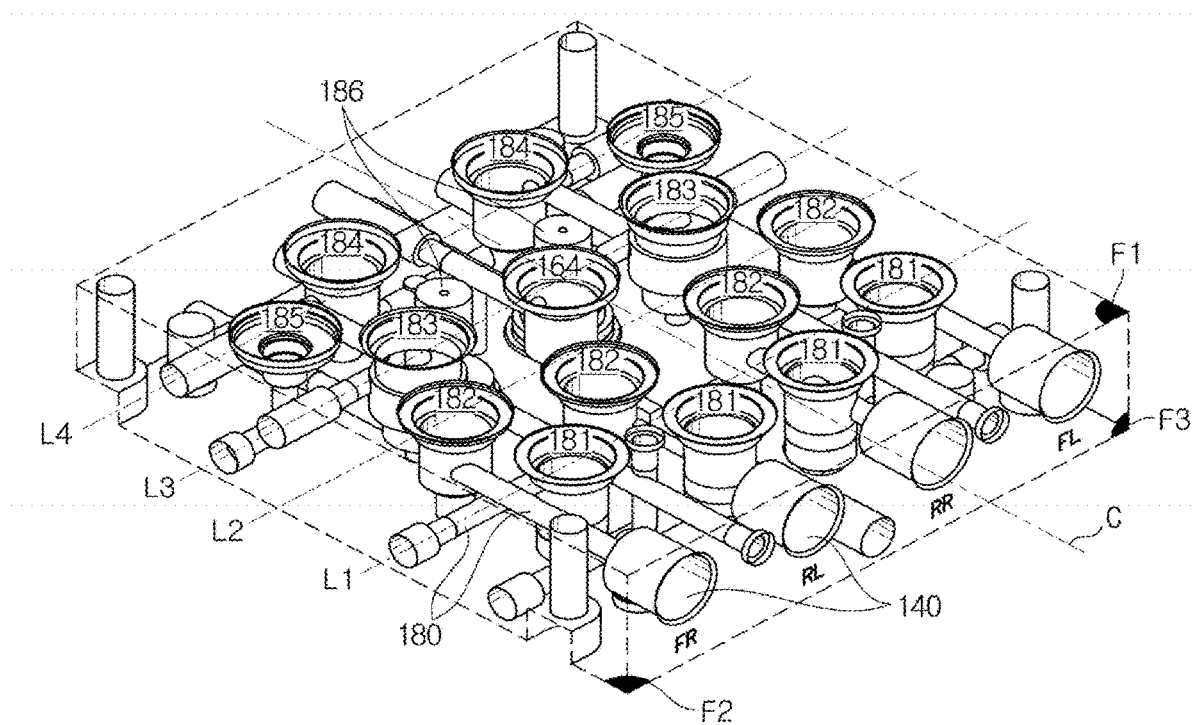

[Fig 3]
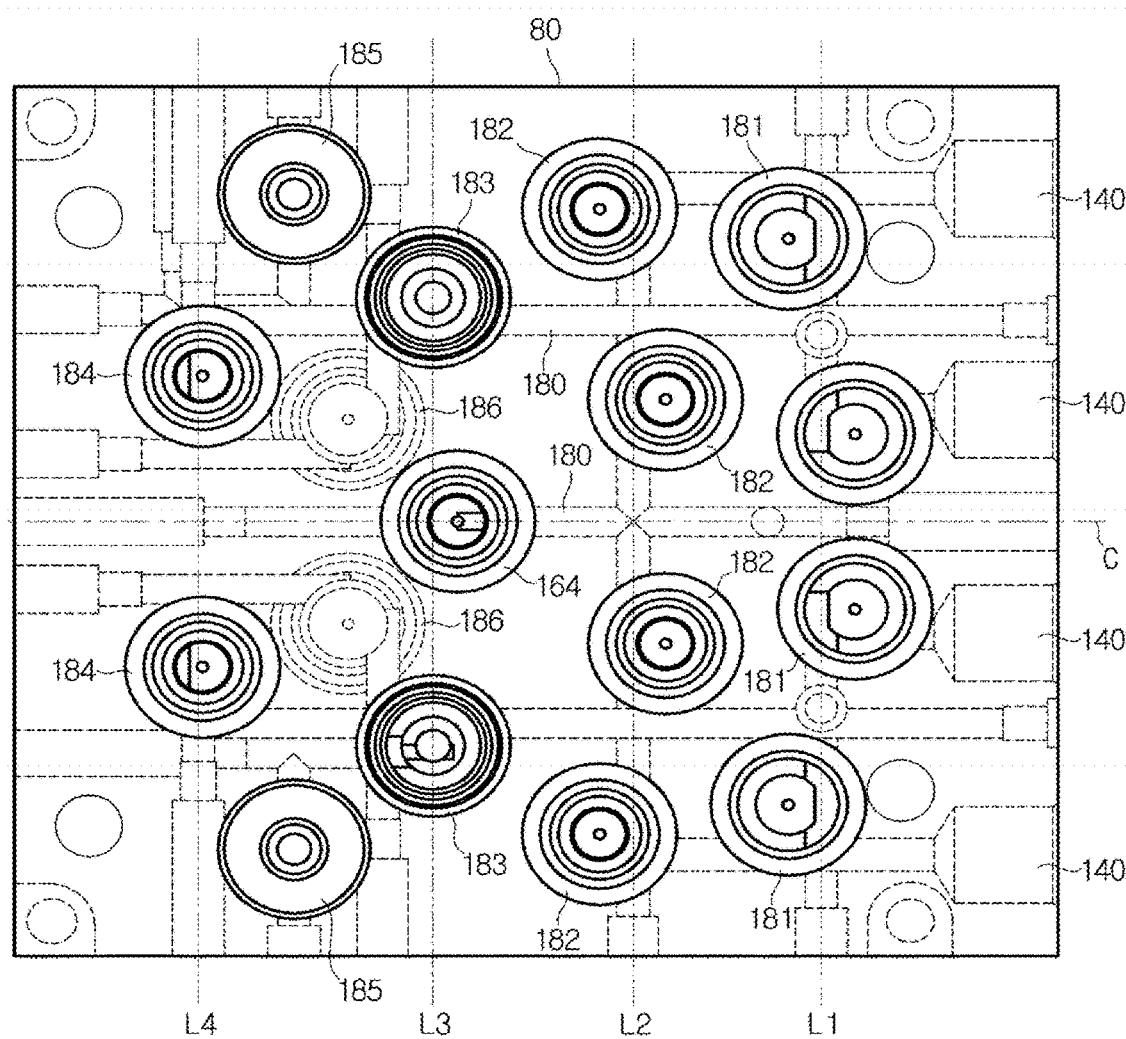

[Fig 4]
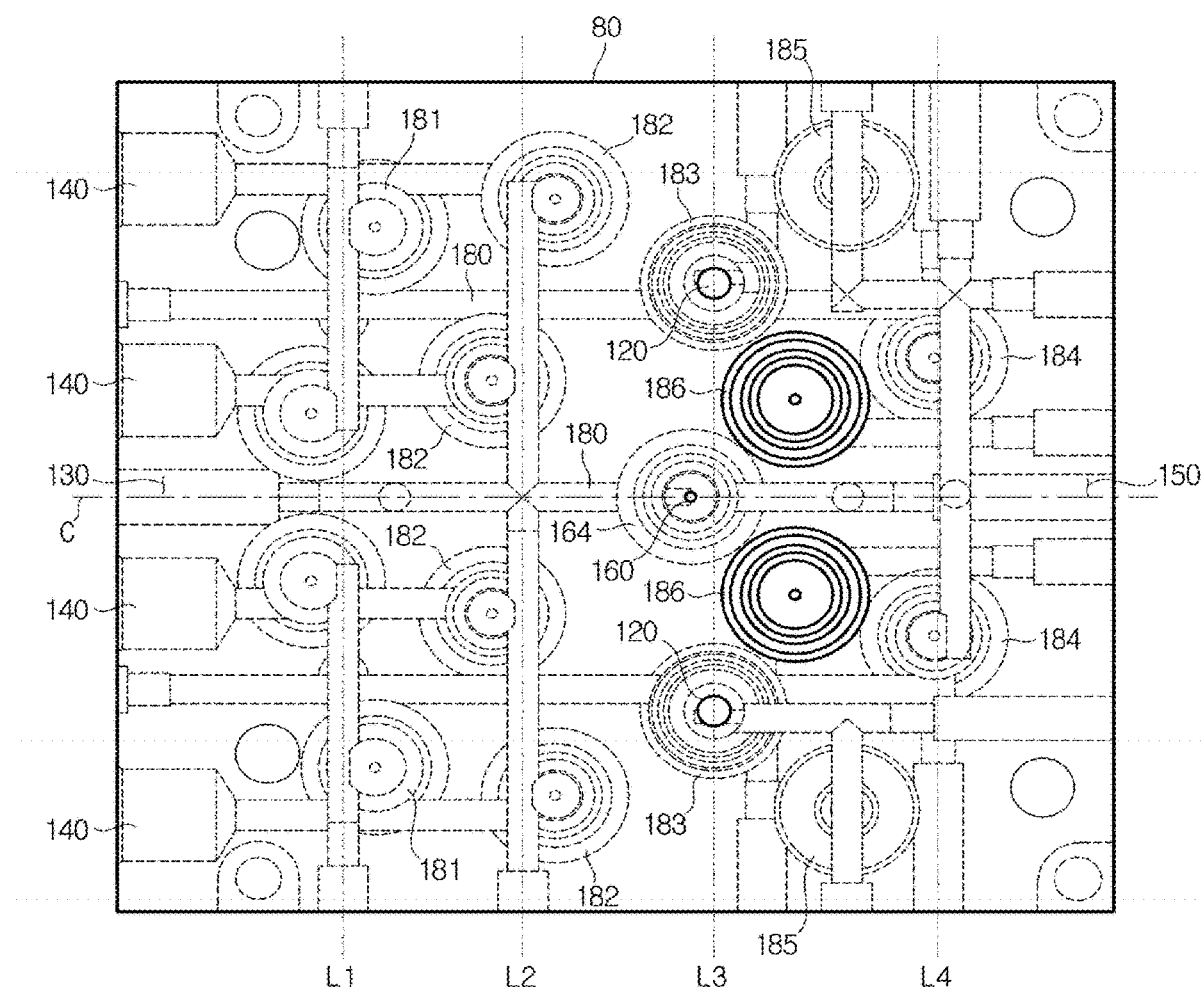

[Fig 5]
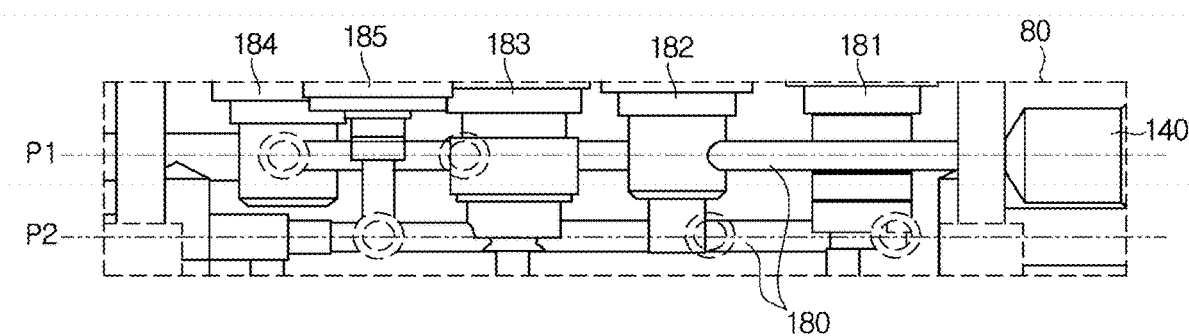

HYDRAULIC UNIT OF ELECTRONIC CONTROL BRAKE SYSTEM

CROSS-REFERENCE TO RELATED APPLICATION

This application claims the benefit of Korean Patent Application No. 10-2014-0140753, filed on Oct. 17, 2014 in the Korean Intellectual Property Office, the disclosure of which is incorporated herein by reference.

BACKGROUND

1. Field

The present invention relates to a hydraulic unit of an electronic control brake system, and more specifically, to a hydraulic unit of an electronic control brake system for controlling brake pressure in a brake system through an electronic control.

2. Description of the Related Art

An electronic control brake system for efficiently preventing a slip that may be generated at the time of braking of a vehicle, sudden unintended acceleration, or sudden acceleration, generally includes not only a booster for a brake system of a vehicle, a master cylinder, and a wheel cylinder, but also a hydraulic unit for controlling a braking hydraulic pressure and an electronic control unit for controlling the hydraulic unit.

Recently, a system for obtaining a more powerful and stable braking force has been proposed, for example, an integrated dynamic brake (IDB) system has been proposed. The proposed IDB system generates a stable and powerful braking force by integrating a master cylinder, a booster, and an electronic stability control (ESC).

This IDB system includes a pressure supplying device which operates a motor by outputting an operation of a brake pedal as an electrical signal through a pedal displacement sensor and converts rotational force of the motor into linear motion; and a hydraulic unit having a modulator block having a plurality of valves to control a brake operation by receiving hydraulic pressure using a force generated by the pressure supplying device. Herein, the hydraulic unit includes a plurality of inflow/outflow valves, a shut-off valve, a switching valve, a check valve, a pressure sensor, a pedal simulation valve, and the like, to control a braking hydraulic pressure transmitted towards wheel cylinders each provided in vehicle wheels, and the these components are compactly installed in the modulator block formed of aluminum. Also, a plurality of valve bores, a port for connecting the master cylinder with the wheel cylinder, and a plurality of passages for guiding a direction of hydraulic flow are processed to compactly install the plurality of components in the modulator block.

However, since a conventional hydraulic unit has an unnecessary dead space other than a space in which a plurality of components are arranged, an improved arrangement structure of the components is required. Since a modulator block increased in size is arranged, a size and weight of a hydraulic unit is increased, and thus there is a problem of increasing costs.

Also, a lack of symmetry between two hydraulic circuits formed in the modulator block generates a pressure deviation, so there is a problem of decreasing durability due to generation of noise and vibration.

A hydraulic unit of an electronic control brake system according to an embodiment of the present invention can minimize a size of a modulator block by arranging passages, formed in the modulator block, in two layers, and minimize a pressure deviation by making a structure of two hydraulic circuits symmetric to each other.

SUMMARY

Therefore, it is an aspect of the present invention to provide a hydraulic unit of an electronic control brake system according to an embodiment of the present invention capable of minimizing a size of a modulator block by arranging passages, formed in the modulator block, in two layers, and minimizing a pressure deviation by making a structure of two hydraulic circuits symmetric to each other.

Additional aspects of the invention will be set forth in part in the description which follows and, in part, will be obvious from the description, or may be learned by practice of the invention.

In accordance with one aspect of the present invention, there is provided a hydraulic unit of an electronic control brake system, which includes a modulator block having a plurality of accommodating bores in which a plurality of valves and pressure sensors, coupled to a master cylinder to control braking hydraulic pressure supplied towards vehicle wheels, are installed, wherein passages connecting between the accommodating bores are formed in the modulator block, and the passages are formed to be divided into two layers.

Also, the modulator block may be formed to have two hydraulic circuits, and the plurality of accommodating bores and the passages forming the two hydraulic circuits may be formed laterally symmetric with respect to the center of the modulator block.

Also, the accommodating bores in which an inflow valve, an outflow valve, a shut-off valve, a simulation valve, pressure sensors, and a switching valve are installed may be formed on one surface of the modulator block, and the accommodating bore in which a check valve is installed may be formed on the other surface of the modulator block.

Also, the plurality of accommodating bores, formed on one surface of the modulator block, may have the inflow valve, the outflow valve, the shut-off valve, the simulation valve, the pressure sensors, and the switching valve installed in order.

Also, the accommodating bore in which the check valve is accommodated may be formed to be positioned between the shut-off valve and the switching valve.

Also, the modulator block may have a master cylinder connecting unit, a reservoir connecting unit, a pedal simulator connecting unit, and a pressure supplying device connecting unit further formed on the other surface of the modulator block.

Also, the reservoir connecting unit, the pedal simulator connecting unit, and the pressure supplying device connecting unit may be positioned on a central line of the modulator block separating the two hydraulic circuits. The reservoir connecting unit and the pressure supplying device connecting unit may be connected to the two hydraulic circuits through the passages.

Also, a wheel cylinder connecting unit may be formed in a side surface between one surface and the other surface of the modulator block.

BRIEF DESCRIPTION OF THE DRAWINGS

These and/or other aspects of the invention will become apparent and more readily appreciated from the following description of the embodiments, taken in conjunction with the accompanying drawings of which:

FIG. 1 is a hydraulic circuit diagram illustrating an electronic control brake system according to an exemplary embodiment of the present invention;

FIG. 2 is a perspective view illustrating a modulator block configuring a hydraulic unit of the electronic control brake system according to the exemplary embodiment of the present invention;

FIG. 3 is a plan view illustrating an upper side of the modulator block shown in FIG. 2;

FIG. 4 is a bottom view illustrating a lower side of the modulator block shown in FIG. 2; and FIG. 5 is a side cross-sectional view of the modulator block shown in FIG. 2.

DETAILED DESCRIPTION

Reference will now be made in detail to the embodiments of the present invention, examples of which are illustrated in the accompanying drawings, wherein like reference numerals refer to like elements throughout. Therefore, the prevent invention is not limited to the drawings set forth below, and may be embodied in different forms, and the drawings set forth below may be exaggerated in order to clarify the spirit of the present invention.

FIG. 1 is a hydraulic circuit diagram illustrating an electronic control brake system according to an exemplary embodiment of the present invention.

Referring to the drawing, the electronic control brake system applied with the present invention includes: a master cylinder 20 for generating hydraulic pressure; a reservoir 30 coupled to an upper part of the master cylinder 20 to store oil; wheel cylinders 40 each installed on vehicle wheels RR, RL, FR, and FL to brake using the transmitted hydraulic pressure; a hydraulic pressure supplying device 50 mechanically operated by receiving, as an electrical signal, a braking intention of a driver from a pedal displacement sensor 11 detecting displacement of a brake pedal 10; a hydraulic unit 70 for controlling the hydraulic pressure to brake the vehicle wheels with a force generated by the hydraulic pressure supplying device 50; and a pedal simulator 60 connected with the master cylinder 20 to provide a reaction force for the brake pedal 10.

At this time, the master cylinder 20 may consist of at least one chamber to generate a hydraulic pressure, but, according to that shown, is provided so as to have two hydraulic pressure units 20a and 20b. Since the master cylinder 20 has the two hydraulic pressure units 20a and 20b, the master cylinder 20 can secure safety by operating the other hydraulic pressure unit when one of the hydraulic pressure units malfunctions.

The hydraulic pressure supplying device 50 includes a cylinder 51 having a predetermined space to receive and store oil; and a ball screw member 54 for pressuring a piston 52 provided in the cylinder 51 by converting rotational force of a motor 55 into linear motion. That is, the motor 55 generates the rotational force by the signal detected by the pedal displacement sensor 11, and the ball screw member 54 converts rotational motion into linear motion to pressurize the piston 52, and thus the hydraulic pressure supplying device 50 generates braking hydraulic pressure. The ball screw member 54, which is a device for converting the rotational motion into the linear motion, is a widely well-known technique, so a detailed description will be omitted.

Meanwhile, a non-illustrated reference numeral '85a' is a first pressure sensor for detecting the hydraulic pressure of a cylinder 51, and a reference numeral '85b' is a second pressure sensor for measuring the oil pressure of the master cylinder 20.

The pedal simulator 60 is connected to the master cylinder 20 to provide a reaction force according to the pedal pressure applied to the brake pedal 10. The pedal simulator 60 includes: a simulation chamber 61 provided to store the oil discharged from the master cylinder 20; a reaction piston 62 provided in the simulation chamber 61; a reaction spring 63 for elastically supporting the reaction piston 62; and a simulation valve 64 connected to a rear end part of the simulation chamber 61. The simulation valve 64 is installed in a modulator block 80 of the hydraulic unit 70 to be described below, and the structure will be described below again.

According to the present invention, the hydraulic unit 70 includes the modulator block 80 having a hydraulic circuit controlling to transmit the braking hydraulic pressure to the wheel cylinders 40 each installed in vehicle wheels FL, FR, RL, and RR.

At this time, the hydraulic circuit includes a first hydraulic circuit 70A for controlling the transmission of hydraulic pressure by connecting the hydraulic pressure unit 20a, one of the pair of hydraulic pressure units 20a and 20b of the master cylinder 20, with the wheel cylinders 40 provided on two vehicle wheels FR and RL; and a second hydraulic pressure circuit 70B for controlling the transmission of hydraulic pressure by connecting the other hydraulic pressure unit 20b with the wheel cylinders 40 provided on the other vehicle wheels FL and RR. The first and second hydraulic circuits 70A and 70B are compactly installed in the modulator block 80.

Each of the hydraulic circuits 70A and 70B, for controlling the hydraulic pressure transmitted to each of the vehicle wheels FL, FR, RL, and RR, includes passages 180 formed in the modulator block 80 and connected to the master cylinder 20, the reservoir 30, the wheel cylinders 40, the hydraulic pressure supplying device 50, and the pedal simulator 60; and a plurality of valves 64, 81, 82, 83, 84, and 86 and the pressure sensors 85a and 85b installed in the modulator block 80 to be connected with the passages 180.

More specifically, the plurality of valves 64, 81, 82, 83, 84, and 86 includes: inflow valves 81 provided as a normal open type (hereafter, referred as 'NO type') solenoid valve arranged on upper sides of the wheel cylinders 40 to control the transmission of the hydraulic pressure to the wheel cylinders 40; outflow valves 82 prepared as a normal closed type (hereafter, referred as 'NC type') solenoid valve arranged on lower sides of the wheel cylinders 40 to control the discharging of the hydraulic pressure from the wheel cylinders 40; switching valves 84 and check valves 86 each provided in the passages 180 connecting the hydraulic pressure supplying device 50 with the hydraulic circuits 70A and 70B to control the hydraulic pressure transmitted to the wheel cylinder 40 by an opening and closing operation; a pair of shut-off valves 83 provided in the passages 180 of the hydraulic circuits 70A and 70B connecting between the master cylinder 20 and the wheel cylinders 40 and controlling the hydraulic pressure transmitted to the wheel cylinders 40 by an opening and closing operation; and a simulation valve 64 provided in the passage 180 connecting the simulation chamber 61 and the reservoir 30. At this time, the pressure sensor 85b for measuring the oil pressure of the master cylinder 20 may be provided between the shut-off valve 83 and the master cylinder 20. Therefore, at the time of braking by a driver, the passages are blocked by the shut-off valves 83, and a braking intention that the driver requires may be determined by the pressure sensor 85b.

The switching valve 84 may be provided as a NO type solenoid valve which is closed in a normal state and is opened when receiving an opening signal. The shut-off valve 83 may be provided as an NC type solenoid valve which is open in a normal state and is closed when receiving a closing signal from an electronic control unit (not shown).

Meanwhile, the check valves 86 are installed in the passages connecting the pressure chamber of cylinder 51 of the hydraulic pressure supplying device 50 with hydraulic circuits 70A and 70B, and are installed in parallel to the pair of switching valves 84, respectively. The check valve 86, which is a unidirectional check valve provided so as to transmit the hydraulic pressure only to the wheel cylinder 40, prevents a pressure from being increased due to an operation delay of the switching valve 84.

Opening and closing operations of valves 64, 81, 82, 83, 84, and 86 are controlled by the electronic control unit.

The hydraulic unit 70 has the passages 180 formed in and passing through the modulator block 80 so as to connect the master cylinder 20, the reservoir 30, the wheel cylinder 40, the hydraulic pressure supplying device 50, and the pedal simulator 60, and has the valves 64, 81, 82, 83, 84, and 86 compactly installed to control the braking hydraulic pressure through the passages 180.

Next, the hydraulic unit 70 provided in the electronic control brake system will be described in more detail with reference to FIGS. 2 to 5. That is, according to an aspect of the present invention, an arrangement structure of a plurality of accommodating bores, into which the plurality of valves 64, 81, 82, 83, 84, and 86 and the pressure sensors 85a and 85b of the modulator block 80 are installed, and the passages 180 for connecting the plurality of accommodating bores will be described.

FIG. 2 is a perspective view illustrating a modulator block configuring a hydraulic unit of the electronic control brake system according to the exemplary embodiment of the present invention, FIG. 3 is a plan view illustrating an upper side of the modulator block shown in FIG. 2, FIG. 4 is a bottom view illustrating a lower side of the modulator block shown in FIG. 2, and FIG. 5 is a side cross-sectional view of the modulator block shown in FIG. 2.

At this time, an upper surface F1, a lower surface F2, and a side surface F3 for providing a direction of the modulator block 80 are set with respect to the modulator block 80 shown in FIG. 2 to assist in understanding the present invention, and this is not limited thereto. It should be understood that a surface for providing a direction of the modulator block 80 may be changed depending on a position in which the modulator block 80 is installed.

Referring to FIGS. 2 to 5, the modulator block 80 has a hexahedral shape. The modulator block 80 includes the plurality of accommodating bores 164, 181, 182, 183, 184, 185, and 186 into which the plurality of valves 64, 81, 82, 83, 84, and 86 and the pressure sensors 85a, and 85b are installed; and the passages 180 for connecting between the accommodating bores 164, 181, 182, 183, 184, 185, and 186. That is, the modulator block 80 includes the accommodating bores 164, 181, 182, 183, 184, 185, and 186 and the passages 180 formed on opposite sides with respect to a central line C to configure two hydraulic circuits 70A and 70B.

More specifically, the accommodating bores 164, 181, 182, 183, 184, and 185, into which the inflow valve 81, the outflow valve 82, the shut-off valve 83, the simulation valve 64, the pressure sensors 85a and 85b, and the switching valve 84 are installed, are formed on one surface of the modulator block 80, that is, the upper surface F1. The accommodating bore 186, into which the check valve 86 is installed, is formed on the other surface of the modulator block 80, that is, the lower surface F2. Also, the passages 180 connecting between the accommodating bores 164, 181, 182, 183, 184, 185, and 186 are formed in the modulator block 80. At this time, as shown in FIG. 5, the passages 180 are formed to be divided into two layers P1 and P2.

Meanwhile, the inflow valve 81, the outflow valve 82, the shut-off valve 83, the simulation valve 64, the pressure sensors 85a, and 85b, and the switching valve 84 are installed in the accommodating bores 164, 181, 182, 183, 184, and 185, formed in the upper surface F1 of the modulator block 80, in order. As shown, a plurality of first accommodating bores 181 of a first valve row L1 into which the plurality of inflow valves 81 are installed, a plurality of second accommodating bores 182 of a second valve row L2 into which the plurality of outflow valves 82 are installed, a plurality of third accommodating bores 183 of a third valve row L3 into which the plurality of shut-off valves 83 are installed, and a plurality of fourth accommodating bores 184 of a fourth valve row L4 into which the plurality of switching valves 84 are installed are formed in the upper surface F1 of the modulator block 80. At this time, the accommodating bore 164 into which the simulation valve 64 is installed is formed between the third accommodating bores 183 in the third valve row L3. That is, the accommodating bore 164 into which the simulation valve 64 is installed is formed to be positioned on the central line C of the modulator block 80. The accommodating bores 164, 181, 182, 183, and 184 formed in the first to fourth valve rows L1 to L4 are arranged on the upper surface F1 of the modulator block 80 in a transverse direction perpendicular to the central line C.

Also, in the upper surface F1 of the modulator block 80, a plurality of accommodating bores 185 into which the pressure sensors 85a and 85b are installed are formed between the third valve row L3 and the fourth valve row L4 in a transverse direction.

Further, in the lower surface F2 of the modulator block 80, the plurality of accommodating bores 186 into which the plurality of check valves 86 are installed are formed between the third valve row L3 and the fourth valve row L4 in a transverse direction. The accommodating bores 185 into which the pressure sensors 85a and 85b are installed and the accommodating bores 186 into which the check valves 86 are installed are alternately positioned to maximize the use of an inner space of the modulator block 80.

A master cylinder connecting unit 120, a reservoir connecting unit 130, a pedal simulator connecting unit 160, and a pressure supplying device connecting unit 150 are formed in the lower surface F2 of the modulator block 80. That is, the master cylinder connecting unit 120 is connected with the master cylinder 20. The reservoir connecting unit 130 is connected with the reservoir 30. The pedal simulator connecting unit 160 is connected with the pedal simulator 60. The pressure supplying device connecting unit 150 is connected with the hydraulic pressure supplying device 50. The reservoir connecting unit 130, the pedal simulator connecting unit 160, and the pressure supplying device connecting unit 150 are formed at the central line C of the modulator block 80 separating the two hydraulic circuits 70A and 70B. At this time, the reservoir connecting unit 130 and the pressure supplying device connecting unit 150 are connected with the hydraulic circuits 70A and 70B through the passages 180. Also, the pedal simulator connecting unit 160 is formed at a lower side of the accommodating bore 164 into which the simulation valve 64, formed in the upper surface F1 of the modulator block 80, is installed, and the master cylinder connecting unit 120 is formed at a lower side of the accommodating bore 183 into which the shut-off valve 83 is installed.

Meanwhile, a wheel cylinder connecting unit 140 is formed in a side surface between the upper surface F1 and the lower surface F2 of the modulator block 80. It is preferable that the wheel cylinder connecting unit 140 is formed in the side surface F3 of the modulator block 80 adjacent to the inflow valve accommodating bore 181 to easily control the braking hydraulic pressure flowing along the passages 180.

As described above, the accommodating bores 164, 181, 182, 183, 184, 185, and 186 and the passages 180 formed in the modulator block 80 are arranged to be laterally symmetric with respect to the central line C of the modulator block 80. Therefore, a pressure deviation between the two hydraulic circuits 70A and 70B may be minimized. Also, the passages 180 connected with the accommodating bores 164, 181, 182, 183, 184, 185, and 186, as shown in FIG. 5, are arranged in two layers P1 and P2, thereby minimizing costs for manufacturing the modulator block 80, and reducing a size and weight of the modulator block 80.

The hydraulic unit of the electronic control brake system according to an embodiment of the present invention can simplify a structure as compared with the conventional one by arranging the passages 180, formed in a modulator block 80, in two layers, and also can reduce weight and costs by minimizing a size of the modulator block 80.

Also, the two hydraulic circuits configured of the plurality of valves 64, 81, 82, 83, 84, and 86 and the passages 180 installed in the modulator block 80 are formed to be symmetrical to each other, thereby minimizing a pressure deviation between the hydraulic circuits 70A and 70B.

Further, the plurality of valves 64, 81, 82, 83, 84, and 86 for controlling the flow of the braking hydraulic pressure are compactly installed in the modulator block 80 by improving an installation position of the valves 64, 81, 82, 83, 84, and 86, thereby using a size of the modulator block 80.

As described above, although the present invention has been described with reference to exemplary embodiments and the accompanying drawings, it would be appreciated that the present invention is not limited thereto, but various modifications and alterations might be made by a person skilled in the art to which the present invention pertain without departing from the scope defined in the claims and their equivalents.

What is claimed is:

1. A hydraulic unit of an electronic control brake system, comprising:
a modulator block having:
a plurality of accommodating bores in which a plurality of valves and a pressure sensor hydraulically coupled to a master cylinder to control braking hydraulic pressure supplied to vehicle wheels are disposed; and
passages connecting between the plurality of accommodating bores, the passages formed in the modulator block,
wherein the plurality of accommodating bores comprise:
an inflow valve accommodating bore, an outflow valve accommodating bore, a shut-off valve accommodating bore, a simulation valve accommodating bore, a pressure sensor accommodating bore, and a switching valve accommodating bore which are formed on a first surface of the modulator block; and
a check valve accommodating bore which is formed on a second surface of the modulator block facing the first surface of the modulator block, and
wherein the inflow valve accommodating bore, the outflow valve accommodating bore, the shut-off valve accommodating bore, the simulation valve accommodating bore, and the pressure sensor accommodating bore are positioned in order.

2. The hydraulic unit of the electronic control brake system of claim 1, wherein the shut-off valve accommodating bore is positioned between the switching valve accommodating bore and the outflow valve.

3. The hydraulic unit of the electronic control brake system of claim 1, wherein a bore hydraulically connected to a reservoir storing oil is formed on a third surface of the modulator block positioned between the first surface and the second surface of the modulator block.

4. The hydraulic unit of the electronic control brake system of claim 3, wherein the first surface of the modulator block is parallel with the second surface of the modulator block, and the third surface of the modulator block is perpendicular to the first and/or second surfaces of the modulator block.

5. The hydraulic unit of the electronic control brake system of claim 1, wherein the check valve accommodating bore is positioned between the shut-off accommodating bore and the switching accommodating bore.

6. The hydraulic unit of the electronic control brake system of claim 1, wherein an inflow valve disposed in the inflow valve accommodating bore is a normally open valve, and an outflow valve disposed in the outflow valve accommodating bore is a normally closed valve.

7. The hydraulic unit of the electronic control brake system of claim 1, further comprising an other shut-off valve accommodating bore,
wherein the shut-off valve accommodating bore is hydraulically connected between one chamber of the master cylinder and two of the vehicle wheels, and the other shut-off valve accommodating bore is hydraulically connected to an other chamber of the master cylinder and two other of the vehicle wheels.

8. A hydraulic unit of an electronic control brake system, comprising:
a modulator block having:
a plurality of accommodating bores in which a plurality of valves and a pressure sensor hydraulically coupled to a master cylinder to control braking hydraulic pressure supplied to vehicle wheels are disposed; and
passages connecting between the plurality of accommodating bores, the passages formed in the modulator block,
wherein the plurality of accommodating bores comprise:
an inflow valve accommodating bore, an outflow valve accommodating bore, a shut-off valve accommodating bore, a simulation valve accommodating bore, a pressure sensor accommodating bore, and a switching valve accommodating bore which are formed on a first surface of the modulator block; and
a check valve accommodating bore which is formed on a second surface of the modulator block facing the first surface of the modulator block, and
wherein the inflow valve accommodating bore, the outflow valve accommodating bore, the shut-off valve accommodating bore, and the switching valve accommodating bore are positioned in order.

9. The hydraulic unit of the electronic control brake system of claim 8, wherein the simulation valve accommodating bore is positioned between the outflow valve accommodating bore and the pressure sensor accommodating bore.

10. The hydraulic unit of the electronic control brake system of claim 8, wherein a bore hydraulically connected to a reservoir storing oil is formed on a third surface of the modulator block positioned between the first surface and the second surface of the modulator block.

11. The hydraulic unit of the electronic control brake system of claim 10, wherein the first surface of the modulator block is parallel with the second surface of the modulator block, and the third surface of the modulator block is perpendicular to the first and/or second surfaces of the modulator block.

12. The hydraulic unit of the electronic control brake system of claim 8, wherein the check valve accommodating bore is positioned between the shut-off accommodating bore and the switching accommodating bore.

13. The hydraulic unit of the electronic control brake system of claim 8, wherein an inflow valve disposed in the inflow valve accommodating bore is a normally open valve, and an outflow valve disposed in the outflow valve accommodating bore is a normally closed valve.

14. The hydraulic unit of the electronic control brake system of claim 8, further comprising an other shut-off valve accommodating bore,
wherein the shut-off valve accommodating bore is hydraulically connected between one chamber of the master cylinder and two of the vehicle wheels, and the other shut-off valve accommodating bore is hydraulically connected to an other chamber of the master cylinder and two other of the vehicle wheels.

15. A hydraulic unit of an electronic control brake system, comprising:
a modulator block having:
a plurality of accommodating bores in which a plurality of valves and a pressure sensor hydraulically coupled to a master cylinder to control braking hydraulic pressure supplied to vehicle wheels are disposed; and
passages connecting between the plurality of accommodating bores, the passages formed in the modulator block,
wherein the plurality of accommodating bores comprise:
an inflow valve accommodating bore, an outflow valve accommodating bore, a shut-off valve accommodating bore, a simulation valve accommodating bore, a pressure sensor accommodating bore, and a switching valve accommodating bore which are formed on a first surface of the modulator block; and
a check valve accommodating bore which is formed on a second surface of the modulator block facing the first surface of the modulator block, and
wherein the inflow valve accommodating bore, the outflow valve accommodating bore, the shut-off valve accommodating bore, the simulation valve accommodating bore, and the switching valve accommodating bore are positioned in order.

16. The hydraulic unit of the electronic control brake system of claim 15, wherein the simulation valve accommodating bore is positioned between the pressure sensor accommodating bore and the outflow valve accommodating bore.

17. The hydraulic unit of the electronic control brake system of claim 15, wherein a bore hydraulically connected to a reservoir storing oil is formed on a third surface of the modulator block positioned between the first surface and the second surface of the modulator block.

18. The hydraulic unit of the electronic control brake system of claim 17, wherein the first surface of the modulator block is parallel with the second surface of the modulator block, and the third surface of the modulator block is perpendicular to the first and/or second surfaces of the modulator block.

19. The hydraulic unit of the electronic control brake system of claim 15, wherein the check valve accommodating bore is positioned between the shut-off accommodating bore and the switching accommodating bore.

20. The hydraulic unit of the electronic control brake system of claim 15, further comprising an other shut-off valve accommodating bore,
wherein the shut-off valve accommodating bore is hydraulically connected between one chamber of the master cylinder and two of the vehicle wheels, and the other shut-off valve accommodating bore is hydraulically connected to an other chamber of the master cylinder and two other of the vehicle wheels.

\* \* \* \* \*